Figure 1:
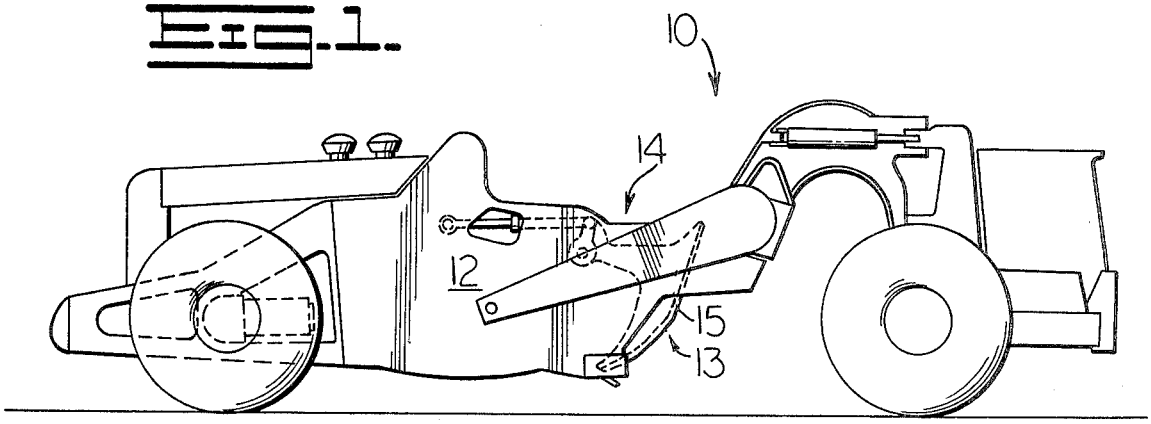
Figure 2:
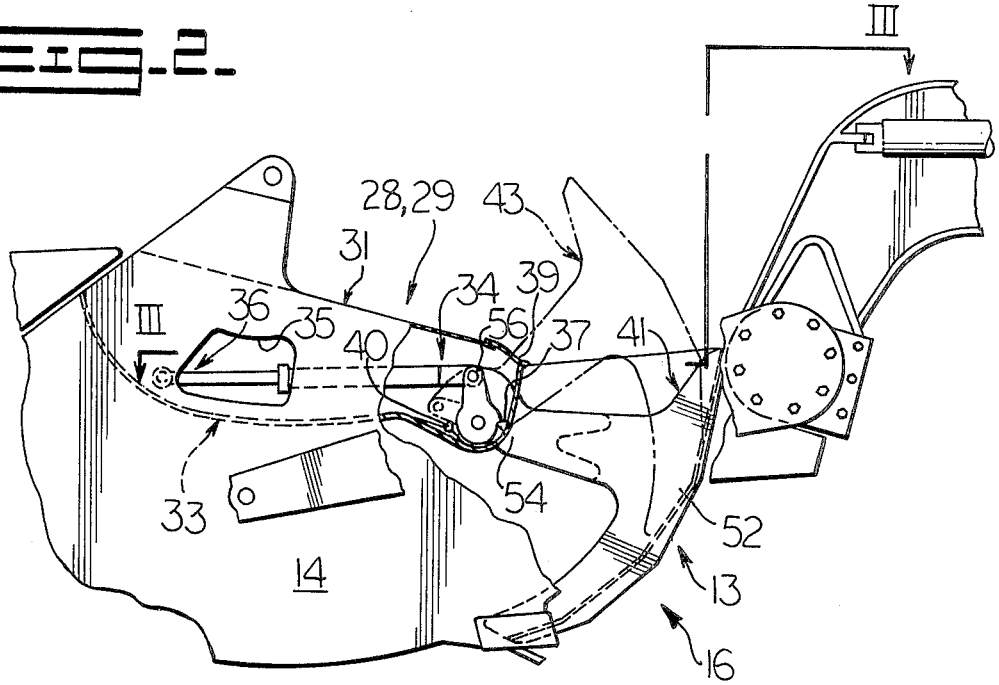
Figure 3:
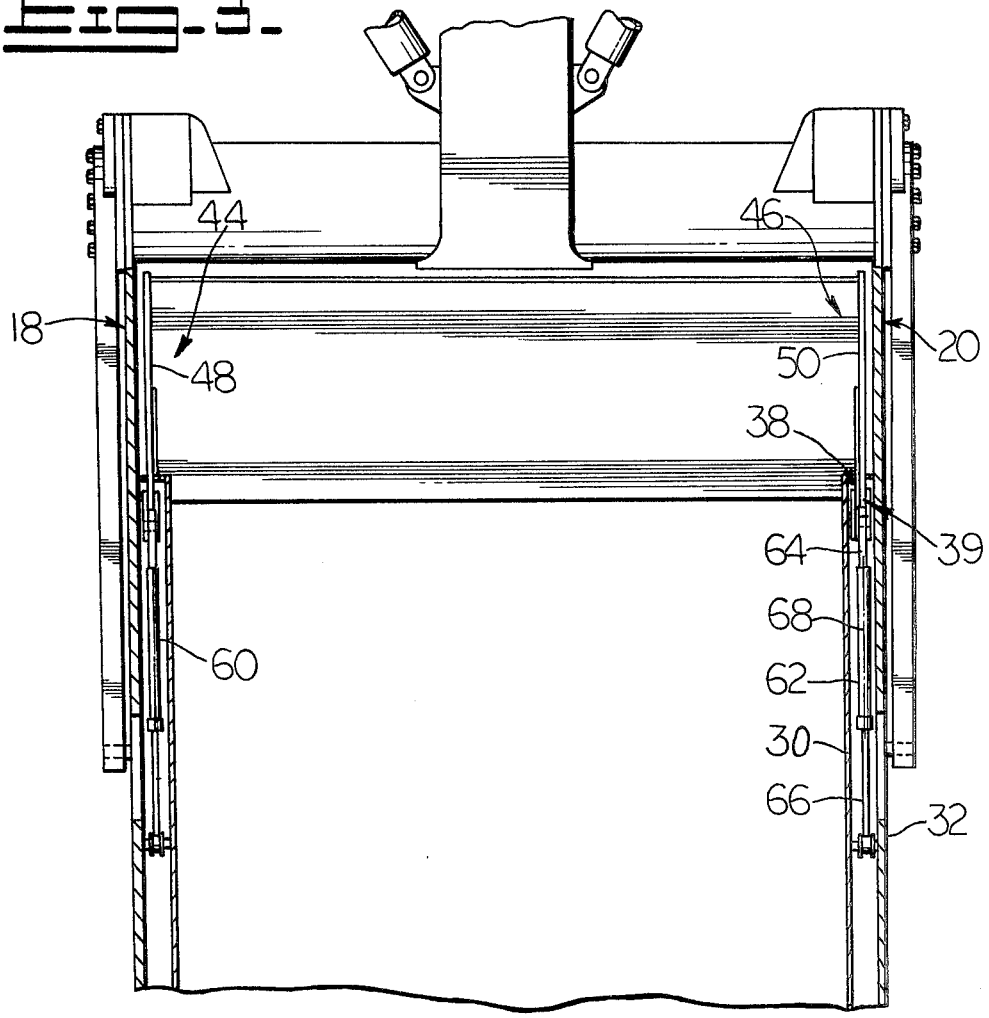

United States Defensive Publication [19] (H) [11] T973,001

Cole et al. [43] Aug. 1, 1978

[54] SCRAPER APRON ASSEMBLY

[75] Inventors: Carroll R. Cole, Decatur; Edward J. Ohms, East Peoria, both of Ill.

[73] Assignee: Caterpillar Tractor Co., Peoria, Ill.

[21] Appl. No.: 850,432

[22] Filed: Nov. 10, 1977

Related U.S. Application Data

[63] Continuation of Ser. No. 788,858, Apr. 19, 1977, abandoned.

[51] Int. Cl.[2] ..... E02F 5/00

[52] U.S. Cl. ..... 37/126 AD

[57] ABSTRACT

A scraper apron assembly has a bowl member which has a front opening and first and second sides. Each of the sides has an upper portion and extends rearwardly from the front opening. Each of the upper portions has first and second end portions with a slot in the second end portion.

An apron is of a size sufficient for closing the front opening, and is pivotally connected and movable through the bowl.

Each of the first and second actuating motors have first and second ends and are positioned between the first and second walls of the bowl. The motors are pivotally connected at their first ends to the apron through respective flanges and at their second ends to first and second walls of the bowl.

5 Claims, 2 Sheets Drawing,

8 Pages Specification

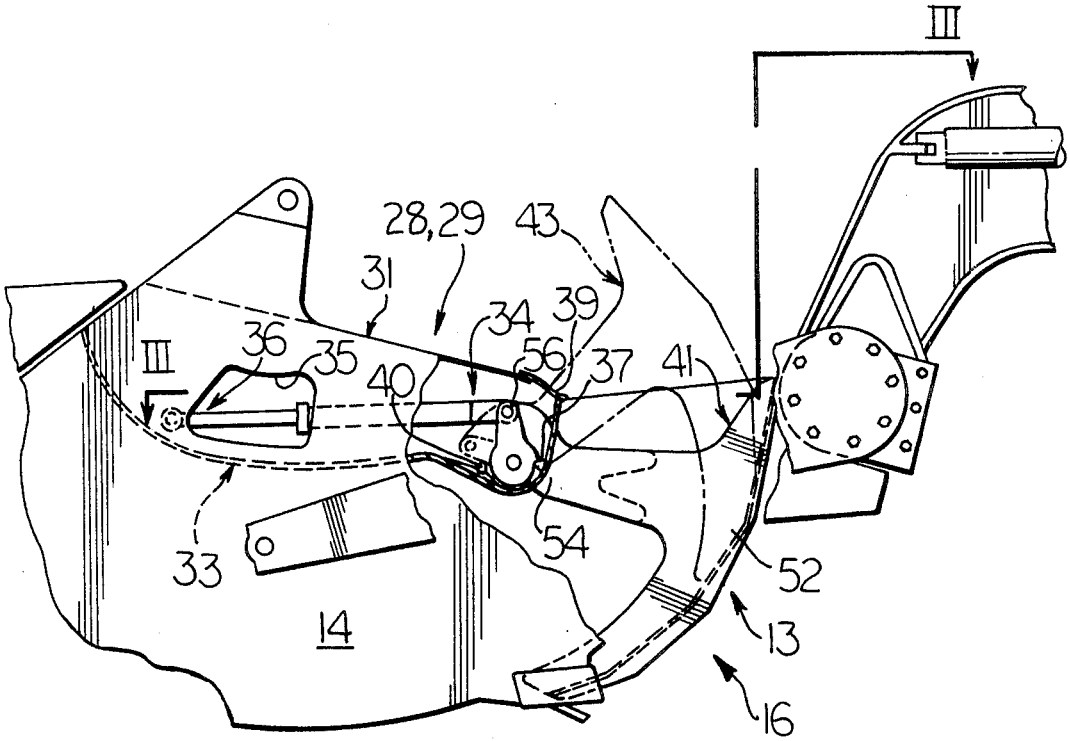

The file of this unexamined application may be inspected and copies thereof may be purchased (849 O.G. 1221, Apr. 9, 1968).